RECORDING OF COLOR TELEVISION PROGRAMS

Filed July 1, 1955 3 Sheets-Sheet 1

CHARLES H. EVANS
ROBERT B. SMITH
INVENTORS
BY Daniel I. Mayne
F. M. Emerson Holmes
ATTORNEYS

RECORDING OF COLOR TELEVISION PROGRAMS

Filed July 1, 1955 3 Sheets-Sheet 2

CHARLES H. EVANS
ROBERT B. SMITH
INVENTORS
BY Daniel I. Mayne
F M Emerson Holmes
ATTORNEYS

RECORDING OF COLOR TELEVISION PROGRAMS

Filed July 1, 1955

3 Sheets-Sheet 3

CHARLES H. EVANS
ROBERT B. SMITH
INVENTORS

BY Daniel I. Mayne
F. M. Emerson Holmes
ATTORNEYS

United States Patent Office 2,912,488
Patented Nov. 10, 1959

2,912,488

RECORDING OF COLOR TELEVISION PROGRAMS

Robert B. Smith and Charles H. Evans, Rochester, N.Y., assignors to Eastman Kodak Company, Rochester, N.Y., a corporation of New Jersey Application July 1, 1955, Serial No. 519,352

2 Claims. (Cl. 178—5.4)

This invention relates to the recording and rebroadcasting of color television programs.

The object of the invention is to simplify the recording so as to avoid the need for color processing, which requires much more time than ordinary black and white processing and hence is objectionable when the rebroadcast is to take place soon after the photographic record is made. This advantage is accomplished by the use of lenticular film such as used in additive color photography for lenticularly dispersing and recording primary color separation images.

It is a particular object of all embodiments of the invention to eliminate practically completely all sources of colorimetric errors from the recording and reproducing process; that is, the color components are completely separated so as to introduce no distortion of the color. This advantage is partly due to the use of an additive process which in this application avoids the colorimetric difficulties associated with subtractive processes and is partly due to the optical arrangement (the geometry of the system in one case and the type of color filtering in another case) for separately recording the component images. Also, according to a preferred embodiment of the invention, the I, Q, and brightness (Y) components are recorded instead of the red, green and blue components.

Since none of the embodiments of the present invention actually record the red, green and blue components in natural colors, the recording medium need not be panchromatic which, of course, reduces the cost of recording considerably; and furthermore, the phosphors on the kinescope recording tube or tubes can be selected to satisfy requirements other than colorimetric requirements. For example, a high intensity, uniform phosphor of good resolution may be selected independent of the color of its fluorescence; the phosphors do not have to fluoresce primary red, primary green and primary blue.

According to the invention a color television program is recorded by establishing in three channels of an electric circuit, the usual signals corresponding to the I, Q and Y components of a scanned subject (either an original or a film). The signals are suitably fed to three cathode ray tubes or other television receiver systems to display images on the receiver screens respectively corresponding to these I, Q and Y signals. Light from the three receiver screens is projected simultaneously toward a common image plane but at different angles (for example, through juxtaposed apertures) and into focus in register in that plane. Lenticular film located in the plane lenticularly disperses and records the three registered images in accordance with the standard principle of lenticular film. The film is then processed to black and white and thus one has a lenticular record of the television program with the I, Q and Y components separately recorded behind each lenticule.

The receiver screens can, in one embodiment of the invention, all fluoresce in the same or similar colors, for example, blue-green. The projecting is then arranged so that the beams from the three receivers are respectively confined by apertures or the like to non-overlapping areas in a plane optically conjugate to the emulsion layer of the film which is, of course, the plane in which the tri-color filter is normally placed when making lenticular color pictures. This plane and the emulsion layer are optically conjugate relative to the lenticules and any other lenses located between the plane and the emulsion layer.

In a somewhat different embodiment of the invention the three receiver screens may fluoresce in primary red, green, and blue but preferably are selected to fluoresce dfifferently in colors which are substantially completely distinct and more distinct than primary red, green and blue. For example, the screens could fluoresce in green, blue and ultraviolet. This embodiment of the invention is preferably employed with the I, Q and Y components but is applicable as a false color system when recording the primary color components themselves. It does not require panchromatic film. The light from the three fluorescing receiver screens is combined into a single beam and a tri-color filter is located in the plane optically conjugate to the emulsion layer of the lenticulated film. The filters may be of the optical interference dichroic type with relatively sharp wavelength cutoffs so as to transmit respectively only one of the three beams.

As an ultraviolet phosphor with a maximum emission at about 3700 Angstrom units, one may use $$Ca_2MgSi_2O_7{:}Ce(0.05)$$

which is the phosphor identified as P–16 in the RCA Handbook HB–3 and in the table on page 79 of the book "Television" by Zworykin and Morton (2nd edition, John Wiley and Sons, Inc.). For blue with a peak at 4580 Angstrom units, a preferred phosphor is hex-ZnS:Ag (0.01) identified as P–11. For green with a peak at 5250 Angstroms one may use rbhdl-$Zn_2SiO_4$:Mn(0.25) identified as P–1 or may use the green component of the group phosphor identified as P–22. Three such phosphors are spectrally substantially completely distinct, meaning they can be substantially completely separated using available filters, for example, dichroic filters of the optical interference type. In practice, the overlap in the fluorescence of three such phosphors is negligible and is not normally detectable when filtered through sharp cutting green (or yellow), blue, and ultra-violet filters.

The total recording and rebroadcasting process according to the present invention involves recording the I, Q and Y components on lenticular film by any of the embodiments above described, processing the film to a photographic record, scanning the record by light (such as by flying spot scanning), projecting light from the record to three photo-responsive cells through mutually distinct areas in the separation plane (this is the plane which corresponds to the filter plane in recording systems if they use banded filters) and using the resultant I, Q and Y signals for broadcasting in the usual way. For example, the broadcast signal includes a carrier wave for picture information as well as the sound wave carrier. The I and Q signals are respectively used to modulate the amplitudes of two quadrature components of a subcarrier referred to as the chrominance subcarrier. These quadrature components are added together vectorially to form a phase and amplitude modulated chrominance subcarrier which is then combined with the Y component signal and applied as amplitude modulation to the main picture carrier wave. It should be noted that this system eliminates from the rebroadcast, the necessity of converting from primary color signals to I, Q and Y signals.

The invention will be more fully understood from the following description when read in connection with the accompanying drawings in which.

Figure 1:
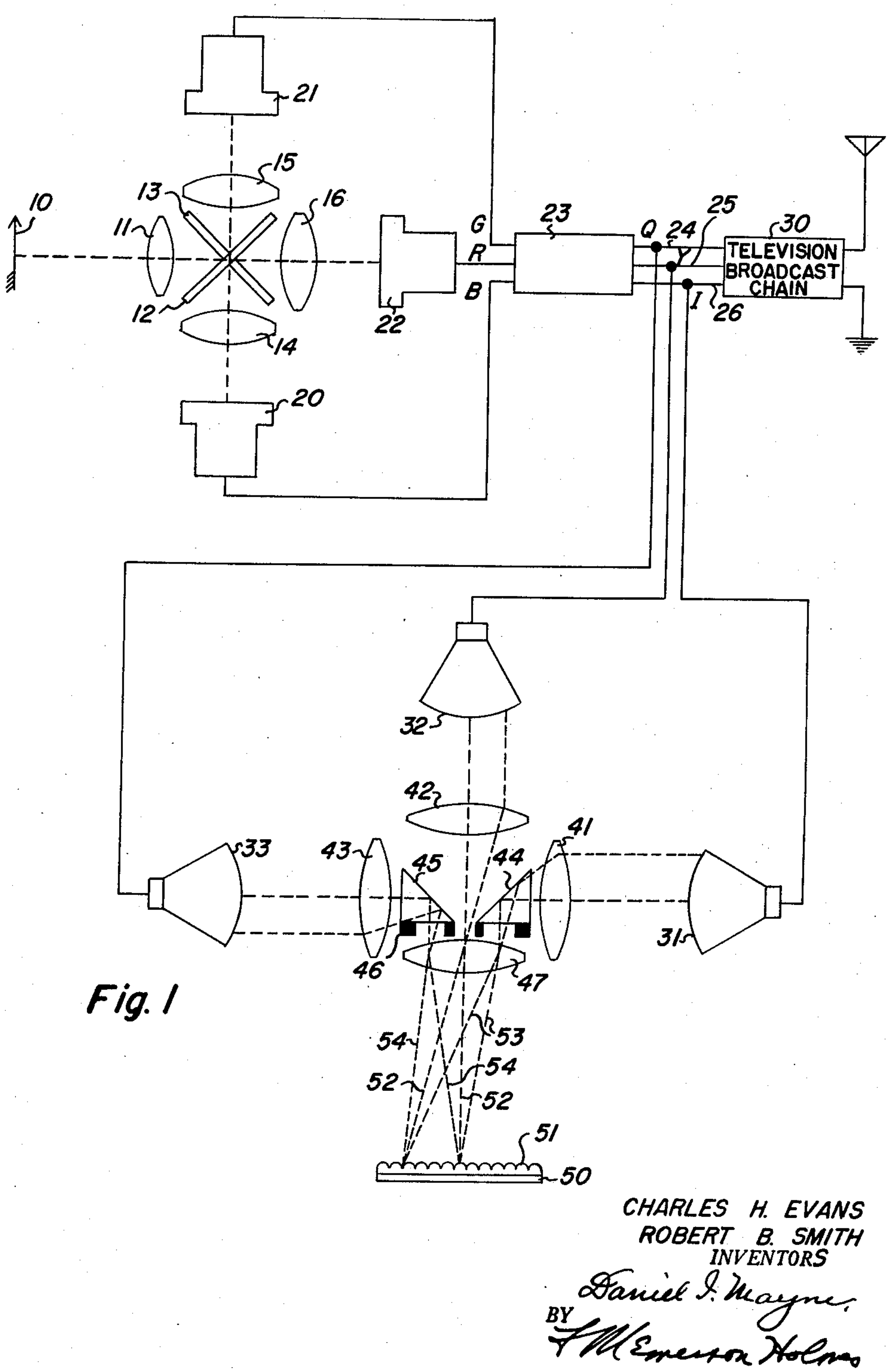
Fig. 1 illustrates schematically a television program recording system according to a preferred embodiment of the invention.

In Fig. 1 light from a colored subject 10 which may be either a live subject or a color film is focused by a lens 11 and dichroic reflectors 12 and 13 through lenses 14, 15 and 16 onto television camera tubes 20, 21 and 22. The dichroic reflector 12 reflects green and transmits red and blue light. The dichroic reflector 13 reflects blue and transmits green and red light. Thus the camera tube 20 receives only primary blue light, the camera tube 21 receives only primary green light and the camera tube 22 receives red and probably infrared light, but the latter may be filtered out if desired by a suitable filter near the lens 16. The green, red and blue signals from the television camera tubes are fed each into a threaded circuit 23 which produces the I, Q and Y components of the color in any of the standard ways. The output of channels 26, 24 and 25 are fed to a television broadcast chain 30 for broadcast in the usual way. It is common practice to modulate the main carrier frequency by the Y or brightness component combined with a subcarrier which carries the I and Q components as phase and amplitude modulation.

According to the present invention the I, Q and Y signals established in the channels 26, 24 and 25 are also fed to cathode ray tubes or other television receiver screen systems illustrated at 31, 32 and 33. In the arrangement shown in Fig. 1 the phosphors of the screens 31, 32 and 33 all fluoresce in the same or similar colors, for example, blue-green, the color being selected merely to be one to which the film 50 is sensitive and to permit the use of a phosphor which has the best response characteristics. The image on the tube 31 is focused by lens 41, prism 44 and lens 47 onto the film 50. Similarly, the image on the screen 32, is focused by the lenses 42 and 47 onto the film 50. The image from the screen 33 is focused by the lens 43, the prism 45 and the lens 47 also onto the film 50. It will be noted in the drawing that the three beams pass through different juxtaposed areas in a mask 46 adjacent to the lens 47. Light from the image on the screen 32 passes through the central aperture as indicated by rays 52, but not through either of the other apertures. Light from the image on screen 31 passes through the righthand aperture as indicated by the rays 53 and light from the image on the screen 33 passes through the left-hand aperture as indicated by the rays 54. The film 50 is exposed through the base which carries lenticules 51 focused on the apertured mask 46. That is, the virtual image of the mask 46 formed by the lens 47 is in the plane conjugate to the emulsion layer of the film 50 with respect to the lenticules 51. This is standard practice in the use of lenticular film. The action of the lenticules 51 is well known. These lenticules disperse the images and record them separately behind each lenticule.

Figures 2, 3:
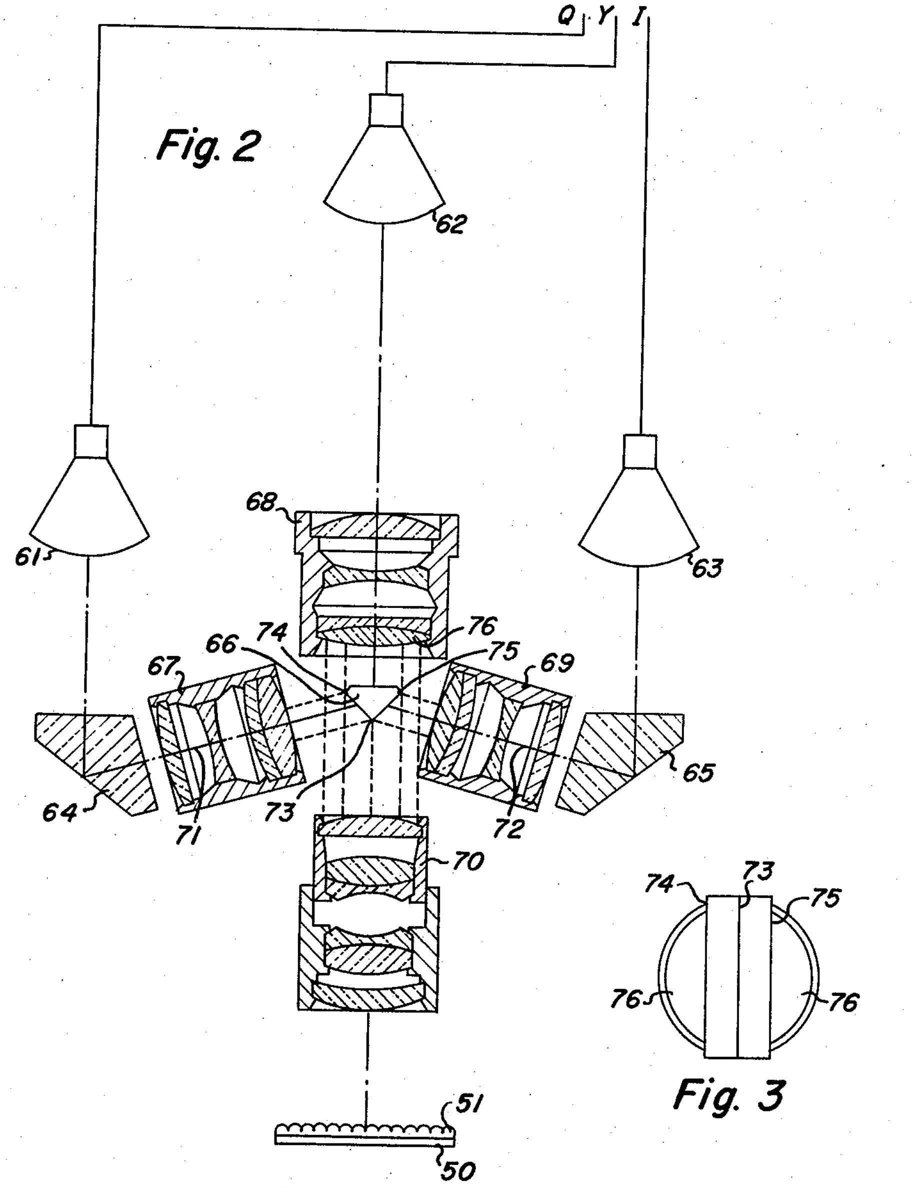
Fig. 2 illustrates a preferred form of the recording part of Fig. 1.
Fig. 3 is a front view of the light beam distinguishing unit part of Fig. 1.

A preferred embodiment of the recording system is shown in Fig. 2. The Q, Y and I channels correspond to those received from channels 24, 25 and 26 of Fig. 1. In Fig. 2 the Q, Y and I components are displayed respectively on cathode ray tubes 61, 62 and 63. Light from the tube 61 is reflected by a prism 64 and then passes through a collimating lens 67. Light from the tube 62 is collimated by a lens 68 and light from the tube 63 is reflected by a prism 65 and collimated by a lens 69. A dihedral reflector 66, whose front surfaces are metal coated, reflects the beams from the lenses 67 and 69. The beam from the lens 68 passes on both sides of the dihedral reflector 66. All three beams are then focused by lens 70 on the film made up of an emulsion layer 50 and a lenticular support 51. The dihedral edge 73 and the two outside edges 74 and 75 of the dihedral reflector 66 constitute the dividing lines between the beams. These three dividing lines do not lie in exactly the same optical plane, but the error introduced thereby is not serious. With respect to the lenticules 51 and the lens 70, these dividing edges 73, 74 and 75 are in a plane, or effectively in a plane, conjugate to the emulsion layer 50 of the film.

As seen from the lens 70, the beam divider appears as shown in Fig. 3. The beam from the Q channel is reflected by the surface between edges 73 and 74. The beam from the I channel is reflected by the surface between the edges 73 and 75 and the beam from the Y channel comes from the front surface 76 of the lens 68 and passes outside of the dividing edges 74 and 75.

The light beams reflected by the prisms 64 and 65 as indicated by broken lines 71 and 72 are at a slight angle, for example, about 80° to the optic axis of the lenses 68 and 70. This provides two advantages. First, it allows the dihedral reflecting surfaces of the reflector 66 to be more nearly coplanar than they would be if they were at exactly 45° to the axis of the lens 70. Secondly, light from the lens 67 which passes the dihedral reflector 66 strikes the front surface of the lens 69 obliquely and this minimizes objectionable reflections. If the lenses 67 and 69 faced each other squarely, there might be objectionable reflections of the unused portions of the beams from each lens.

The arrangement shown in Fig. 2 also has the advantages normally associated with four-banded filters as compared to three-banded filters. If there is any overlapping of the images behind adjacent lenticules on the film, a four-band system provides that the overlap occurs between parts of the same component. The three-band system in Fig. 1 requires that there be no overlap since such overlap would be an overlap of part of the Q component onto part of the I component. In Fig. 2, on the other hand, both outside bands represent the Y component and if there is any overlap, it is by part of the Y component onto another part of this same Y component. Also, any vignetting in the azimuth transverse to the lenticules is less likely to cause wedging or differentiation between the components when a four-band system is used. In Fig. 1 lateral vignetting would cause the Q component to decrease as the I component increases and vice versa, whereas in Fig. 2 the decrease in one side of the Y component would tend to be accompanied by an increase in this same component from the other side. These advantages of a four-band system as compared to a three-band system are well known in the lenticular color photography art.

The systems illustrated in Figs. 1 and 2 have many advantages. The film 50 need not be panchromatic and hence may be quite inexpensive. It is processed by simple black and white processing either to a negative or by reversal to a positive. In fact, the images on the screens 31, 32 and 33 may be either negative or positive as desired. Since the film 50 may be processed very rapidly, it is ready for rebroadcasting in a very short time after recording of the color images. By recording I, Q and Y, there is no need to re-establish the B, G and R components and then to resynthesize I, Q and Y before broadcast. The optical system illustrated in Fig. 1 ensures complete separation of the images from the screens 31, 32 and 33 in the emulsion layer 50 and hence colorimetric relationships are unaffected by the recording and reproduction.

Figs. 1, 2 and 3 illustrate the recording of I, Q and Y but could be used for recording R, G and B components. In neither case are any color filters necessary in the recording system. The three beams are geometrically separated in the plane conjugate to the film emulsion.

Figures 4, 5, 6, 7:
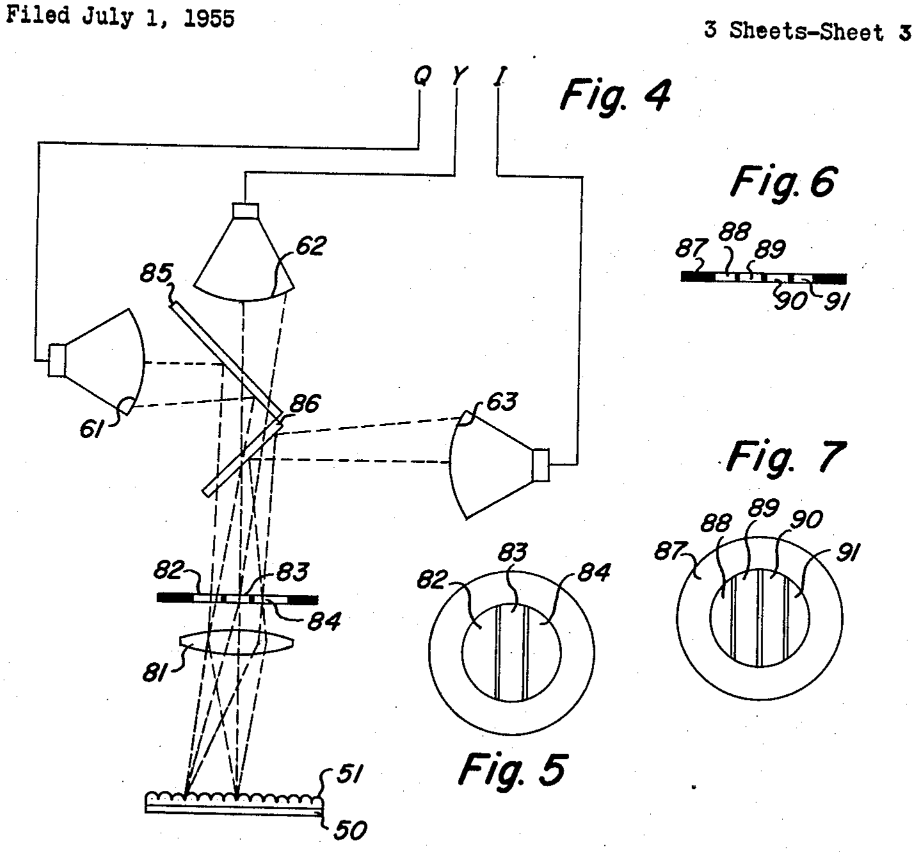
Fig. 4 illustrates an alternative embodiment of the invention.
Fig. 5 is a front view of the tri-color filter used in Fig. 4.
Figs. 6 and 7 are respectively a cross section and a front view of an alternative form of tri-color filter made up in four areas.

In Fig. 4 a slightly different arrangement is shown for recording I, Q and Y (or R, G and B) components of the color. A lens 81 focuses the light from the three screens 61, 62 and 63 directly on the film 50. Thus the light is not collimated as it passes through the color filters. However, the focal length of the lens 81 is such that the variation in angle of incidence of the various rays striking the reflectors 85 and 86 or the dichroic filters 82, 83 and 84 is small and the deviation from parallelism does not involve any serious color or density discrepancies. The screens 61 and 63 may be on the same side of the main recording beam, in which case the semi-reflectors 85 and 86 would be more or less parallel. A front view of the three-band filter is shown in Fig. 5. The areas of the various colored filters 82, 83 and 84 are preselected to give the relative intensity of exposure desired at the film 50.

In each of the Figs. 1 and 4 the Y or brightness component has been illustrated as being recorded centrally behind each lenticule. The Y component is, of course, the most important one and for this reason it is given the preferred position for recording. Using a three-banded color filter, any possible overlap of one order of images with the next order, i.e., with the images behind the next lenticule would involve a mingling of the I and Q components. This in general would be serious although, of course, overlapping can be minimized by keeping the outer bands of the banded filter quite narrow.

A preferred arrangement is illustrated in Figs. 6 and 7 in which the tri-color filter 87 is made up in four bands 88, 89, 90 and 91. Thus, in a spectral separation system one gets the same advantages from a four-band filter as was obtained by the geometric system shown in Fig. 2. The band 89, for example, may be colored to transmit only the Q component, the band 90 to transmit only the I component and both bands 88 and 91 may be selected to transmit the Y component. In this case, mingling of one order of images with the next would have no colorimetric effects but merely appear as some loss of resolution in the brightness component. Alternatively the two outer bands could correspond to either the I or Q component and eliminate both colorimetric aberrations due to overlap and reduction of the resolution in the brightness component. Again, the systems shown in Figs. 4, 5, 6 and 7 could be just as easily used to record the R, G and B components without introducing colorimetric aberrations.

Figure 8:
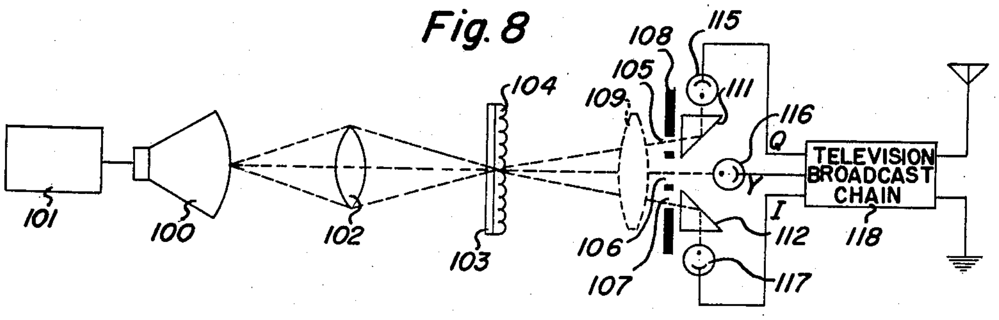
Fig. 8 illustrates schematically rebroadcasting from a kinescope recording made according to any of the processes illustrated in Figs. 1 to 7.

In Fig. 8 a cathode ray tube 100 operated by a suitable control circuit 101 produces a flying spot which is focused by lens 102 on a film 103. Flying spot scanning is particularly suitable for the present invention, but other well known equivalents could be used for scanning the film 103 on which a color television program has been recorded by any of the systems described above. The lenticular support 104 separates the light from the three images and sends it respectively through apertures 105, 106 and 107 in an aperture plane 108 located in the plane conjugate to the film 103 with respect to the lenticules 104. No lens system is absolutely necessary at this point, but a field lens 109 shown by broken lines may be located adjacent to the aperture plate 108. Light through the apertures 105, 106 and 107 falls on photoelectric cells 115, 116 and 117, suitable prisms 111 and 112 being interposed to obviate the need for having the photoelectric cells close to each other. The outputs of these three cells constitute the Q, Y and I components of the scanned colored image and these component signals are fed directly into a television broadcast chain 118 for modulation of a broadcast carrier wave in the usual way.

When lenticular film is used in conjunction with a television raster, for example, in recording or in broadcasting according to the above described methods, there is always a possibility that spurious moire (or "beat") patterns will be generated if the lenticules are disposed approximately or exactly parallel to the television scanning lines. Such effects can be avoided by effectively destroying the scanning line structure of the television raster. This can readily be accomplished by the known technique of spot position modulation, whereby the position of the scanning spot which lays down the raster is sinusoidally modulated at a high frequency (of the order of 10 megacycles per second) and a low amplitude in a direction perpendicular to the scanning lines.

We claim:

1. Apparatus for recording three-component-color-television signals which comprises three television receiver screens whose fluorescences are spectrally substantially completely distinct and more distinct than primary red, green and blue, means for displaying on said screens images respectively corresponding to the component signals, optical means for combining light from the three screens into a common beam and for focusing the beam onto a common image plane, means for supporting lenticular film in said plane with the lenticules facing the incident beam, a tri-color filter with substantially juxtaposed areas respectively transmitting only one of said fluorescences and means for supporting said filter in the plane on which the lenticules are focused.

2. Apparatus for photographically recording three-component-color-television signals on lenticular film, which comprises three television receiver screens, means for displaying on said screens images respectively corresponding to the three component signals, a dihedral mirror with a dihedral angle greater than 90°, the dihedral surfaces being outwardly reflecting, the mirror being opaque to transmitted light, a main objective lens aligned with the dihedral mirror to receive light from the dihedral surfaces and also light passing both sides of the dihedral mirror, three auxiliary objective lenses respectively for receiving light from the three screens, one of the three auxiliary lenses being aligned to direct the light past both sides of the dihedral mirror to the main objective and the other two auxiliary lenses being aligned to direct light, at more than 90° to the light from said one of the three, respectively to the dihedral surfaces and thence by reflection toward the main objective, each of the auxiliary lenses co-operating with the main objective to focus the light from the screens in a common image plane and means for supporting lenticular film having a photosensitive surface, in said image plane with the lenticules facing the focused light, the optical system formed by the lenticules and the main objective lens having the dihedral mirror approximately conjugate to the photo sensitive surface.

References Cited in the file of this patent

UNITED STATES PATENTS

| | | |
|---|---|---|
| 1,970,936 | Ives | Aug. 21, 1934 |
| 2,531,031 | De France | Nov. 21, 1950 |
| 2,600,868 | Hales | June 17, 1952 |
| 2,736,762 | Kell | Feb. 28, 1956 |

FOREIGN PATENTS

| | | |
|---|---|---|
| 756,696 | Great Britain | Sept. 5, 1956 |

UNITED STATES PATENT OFFICE

CERTIFICATE OF CORRECTION

Patent No. 2,912,488 November 10, 1959

Robert B. Smith et al.

It is hereby certified that error appears in the printed specification of the above numbered patent requiring correction and that the said Letters Patent should read as corrected below.

Column 3, line 6, for "unit part of Fig. 1" read -- unit of Fig. 2 --; column 3, line 30, for "threaded" read -- standard --.

Signed and sealed this 31st day of May 1960.

(SEAL)

Attest:

KARL H. AXLINE
Attesting Officer

ROBERT C. WATSON
Commissioner of Patents